March 11, 1952 H. H. HILLMER ET AL 2,588,385

PRINTING APPARATUS

Filed Aug. 1, 1947 5 Sheets-Sheet 1

Herman H. Hillmer
Henry P. Orent
Inventors

By Arthur H. Sturges
Attorney

PRINTING APPARATUS

Filed Aug. 1, 1947

5 Sheets-Sheet 2

Herman H. Hillmer Inventors
Henry P. Orent
By Arthur H. Sturges
Attorney

Herman H. Hillmer Inventors
Henry P. Orent
By Arthur H. Sturges
Attorney

March 11, 1952 H. H. HILLMER ET AL 2,588,385

PRINTING APPARATUS

Filed Aug. 1, 1947

5 Sheets-Sheet 4

Herman H. Hillmer
Henry P. Orent
Inventors

By Arthur H. Sturges
Attorney

March 11, 1952 H. H. HILLMER ET AL 2,588,385

PRINTING APPARATUS

Filed Aug. 1, 1947

5 Sheets-Sheet 5

Inventors

Herman H. Hillmer

Henry P. Orent

By Arthur H. Sturges

Attorney

Patented Mar. 11, 1952

2,588,385

UNITED STATES PATENT OFFICE 2,588,385

PRINTING APPARATUS

Herman H. Hillmer and Henry P. Orent, Omaha, Nebr., assignors to Printing Engineers Incorporated, Omaha, Nebr., a corporation of Nebraska Application August 1, 1947, Serial No. 765,400

3 Claims. (Cl. 95—73)

This invention relates to contact printing machines and more particularly it is an object of the invention to provide a printing machine particularly adapted for accurately reproducing a single image or group of images from a film, plate, or the like into a plurality of positions on an image-receiving film, plate or the like.

Machines of the general type described, are referred to in the art as "step-and-repeat" machines and employ two oppositely disposed holders for receiving printing material, one of the holders being movable with respect to the other so that a single image from material on one of the holders can be reproduced in a plurality of positions on the material on the other holder by successive exposure steps. It is very important in such a progress that the images be reproduced with accuracy in predetermined positions so that there is no waste of material.

This application includes the frame structure of the printing machine and the reciprocating carriages, the copending application with the Serial No. 74,323 includes the step and repeat structure with the support lowering and carriage locking means, the copending application with the Serial No. 74,324 includes the punch structure and film positioning elements, and the copending application with the Serial No. 74,810 includes the lamp housing and vacuum producing means.

Particular difficulty has been found in two color printing with prior art machines since great accuracy of operation is required to register an image of one color within an image of another color without objectionable overlapping. Overlapping is similarly undesirable although not as noticeable in one color printing.

Machines of the prior art have employed micrometer screws, and the like in an attempt to facilitate the proper positioning of the holders. Considerable waste has been occasioned in their use, however, since the factor of human error is involved. Additionally, such micrometer screws become imperfect through wear.

A further disadvantage of prior art machines has been the relatively crude methods used for attaching printing positives and negatives to the respective holders. Pressure sensitive tape, cementitious material, and paste have been employed with attendant loss of time and with waste resultant from inaccuracy.

It has been especially difficult and almost impossible with machines of the prior art to truly position a film upon a holder at times when a two or three color reproduction is required. Another disadvantage of such machines has been the employment of a vertically disposed plate or holder to which it is especially difficult to accurately attach film.

It is therefore, an object of the present invention to provide a machine which is so constructed that accurate results may be obtained therefrom.

A particular object of the invention is to provide a machine as described having the accuracy of operation required to register an image of one color within an image of another color without objectionable overlapping.

Another object of the invention is to provide a machine as described which employs film holders which are normally horizontally disposed during use.

A further object of the invention is to provide a machine as described employing vacuum as a more efficient means to secure printing material to the oppositely disposed holders thereof.

Still another object of the invention is to provide a machine for reproducing an image in a plurality of positions which employs detents which may be accurately spaced apart prior to operation and which are not as susceptible to inaccuracy, due to wear, as devices of the prior art.

A still further object of the invention resides in the provision of a mounting for pivotally and slideably carrying one of the holders of the invention in a manner, whereby the holder can be swung from a horizontal use position to a vertical position for facilitating the placing of a sheet of printing material thereon.

Yet another object of the invention is to provide a machine as described, one of the holders of which is particularly mounted in a manner adapted to compensate for other inaccuracies and for varying thicknesses of films, plates and the like, to cause oppositely disposed ones of the latter, when in use with the invention, to be pressed against each other for preventing light from entering therebetween.

Yet another object of the invention is to provide a method of and means for accurately and quickly placing image-bearing printing material upon one of the holders of the invention.

Other and still further objects and advantages of the invention will become apparent from the following detailed description of a preferred embodiment thereof.

Figure 1:
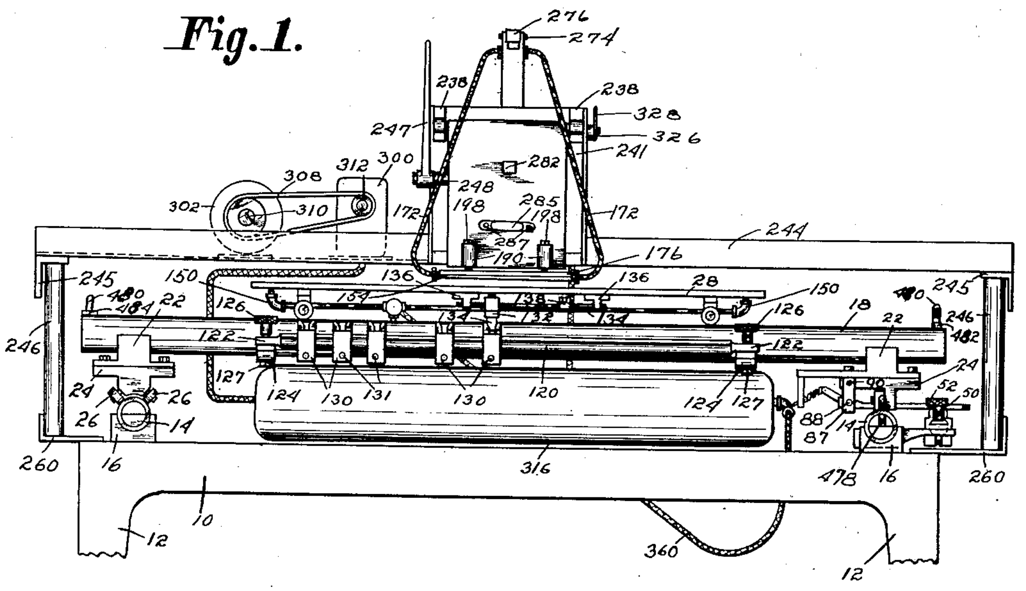
Figure 1 is a front elevation of the machine, portions of the supporting legs being broken away.

The printing machine of this invention includes a frame or support 10, mounted upon suitable legs 12. The frame 10 is preferably provided with an elongated platform top having a plurality, preferably two, parallel spaced apart tracks, guides or rails 14, mounted thereon. The tracks or rails 14, are preferably in the form of rounded tubular pipes and are supported in blocks or shims 16.

Above the rails or tracks 14, a second pair of rails 18 are disposed in a position transverse and at a right angle with respect to the rails 14. The tracks 18 are maintained in spaced apart parallelism by two suitable supporting brackets 20. The latter are disposed transversely with respect to the second pair of tracks 18, one at each end thereof and positioned therebeneath. The brackets 20 are each provided with an elongated mid-section and a grooved, transversely disposed, end portion 22 for receiving the tracks 18.

Disposed beneath and attached to each of the end portions 22 of the brackets 20, one of four roller supporting brackets 24 are provided. Each of the roller brackets 24, on the left-hand side of the machine, are provided with two rollers 26 mounted on suitable axles for bearing against the corresponding track 14. Only one vertically disposed roller 26 is mounted on each of the right hand roller brackets 24, that one roller being maintained in alignment with the top of the right-hand track 14 by the provision of two inclinedly disposed rollers 26 on each of the left-hand roller brackets 20.

As thus described, the second rails 18 are slideably mounted on the first rails 4 and disposed at a right angle with respect thereto for movement only in directions in alignment with the latter. The brackets 20, the end portions 22, and the rails 18 form a carriage for the support of a later described platform.

Above the upper rails 18 a horizontally disposed platform or holder 28 is provided for purposes later described. Beneath the holder plate 28 suitable brackets 30 and 32 are secured by means of bolts 34 and 36, respectively. The brackets 30, which are disposed toward the forward side of the machine as shown in Figure 1, are each adapted to support a single rotatably mounted roller 40, which latter is adapted to rotate in a plane in an alignment with the corresponding upper track 18. The rearward brackets 32 are each provided with two inclinedly disposed spaced apart rollers 42, rotatably secured on suitable axles to the brackets 32 in positions for engaging the rearward upper track 18. The purpose of the rollers 40 and 42 and the brackets 30 and 32 is to support the plate or holder 28 in slideable relationship with respect to the upper track 18.

Figure 8:
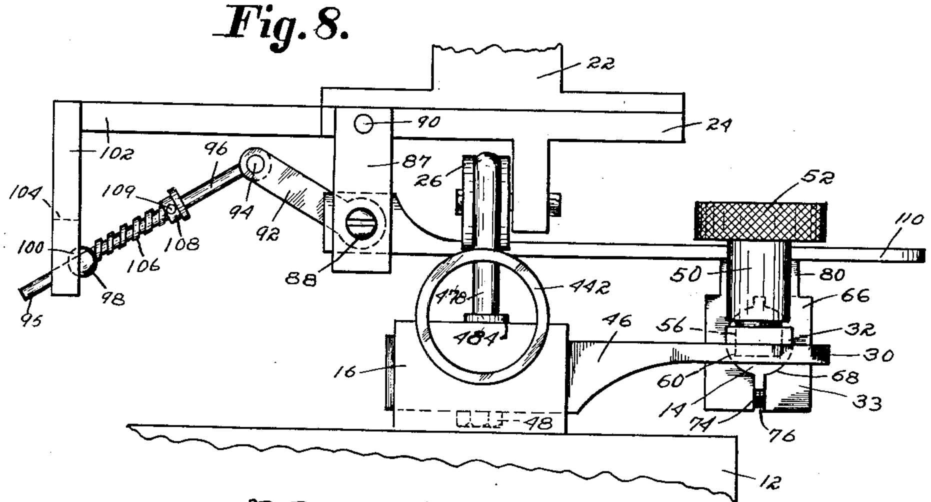
Figure 8 is an enlarged detail of a portion of the new device and showing a locking dog which is cooperative with the detent members such as are shown in detail in Figures 5 and 6.
Figure 9:
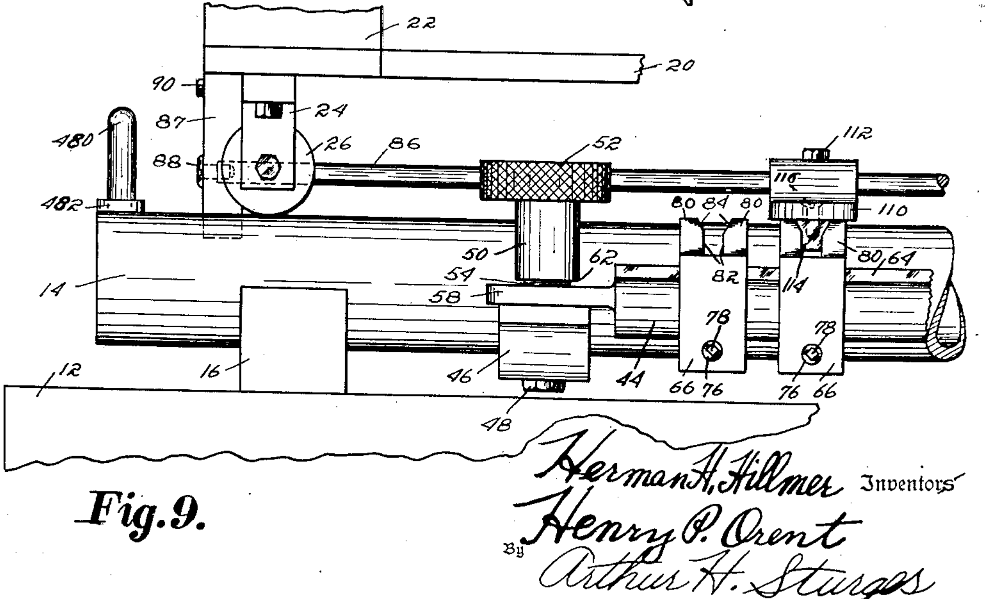
Figure 9 is a front elevation view of the parts shown in Figure 8 as seen from the right-hand side thereof.

As best shown in Figures 8 and 9, a detent supporting rod 44 is disposed in parallelism with the right-hand lower rail or track 14, on the outer side thereof. The rod 44 is supported alongside the adjacent track 14 by means of a pair of suitable brackets 46 which are attached to the said adjacent track by means of suitable bolts 48. The brackets 46 are disposed at each end of the rod 44 and are attached thereto by means of suitable removable bolts 50. Each of the bolts 50 is disposed in a vertical position and is provided with a rogose head 52, so that the bolt 50 may be easily tightened or released by hand.

At their lower end the bolts 52 are each provided with a threaded portion 54 of lesser diameter. The portions 54 are adapted to extend through apertures 56 in respective flattened extensions 58 at the ends of the rod 44. The extensions 58 rest upon the upper horizontal surface of the bracket 46 and a threaded recess 60 is provided through each of the latter for the receipt of the lower end of the bolt 50.

As thus described, each of the bolts 50 are provided with a shoulder 62 at the upper end of the smaller diametered threaded lower portion 54 and the shoulders 62 are adapted to compress the extensions 58 against the flat upper surfaces of the brackets 46.

The rods 44 are provided with an outstanding ridge 64 extending longitudinally thereof and protruding preferably from the upper side thereof. The rods 44 are preferably of circular shape in cross-section while the attached ridge 64 is of rectangular shape.

Figures 5, 6:
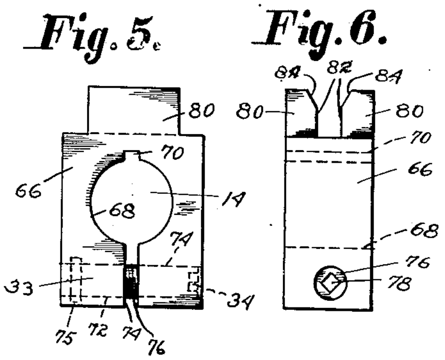
Figure 5 is a plan view of one of a number of like adjustable stop detent members employed.
Figure 6 is an edge view of the detent shown in Figure 5.

A plurality of like detents are arranged in a row and are each adapted to be disposed upon the rod 64. The latter are best shown in Figures 5 and 6 and are provided with approximately yoke or "U-shaped" main body portions as shown of generally rectangular shape in side elevation. The main body portions are each provided with a circular passageway 68 extending therethrough for receiving the rod 44 and the passageway 68 is in communication with a notch or kerf 70 provided in the uppermost or other portion of the wall thereof, corresponding to the position of the ridge 64.

The kerfs 70 are co-extensive with the passageways 68 and are for the purpose of snugly receiving the ridge 64 for maintaining the detents 66 upright upon the rod 44.

The lower end of each of the detents 66 is bifurcated by means of a suitable slot 72 which extends inwardly to the passageway 68. A suitable aperture 74 is provided extending entirely through the bifurcated end of each of the detents 66 in a direction transverse with respect to the axis of the passageway 68. The walls of that portion of the aperture 74 which is in the right-hand section of the bifurcated lower end of each detent 66, as shown in Figure 5, are threaded, while the walls of the left-hand lower end, as shown, are not threaded. The extreme left-hand end of the aperture 74 is provided with a portion 75 of larger diameter than the remainder of the aperture 74.

As thus described the detents 66 are each formed having an open center bounded on two sides by two outwardly extending arms having ends which extend beyond and on either side of the rod 64.

Received in the apertures 74 is a suitable screw 76 and the latter is provided with a rectangular notch 78 in the right-hand end thereof, as shown in Figure 5, so that a key of rectangular cross-section may be inserted therein for rotating the screw 76 to draw the bifurcated lower ends of the detents 66 together about the rod 44. The left-hand end of the screw 76, as shown in Figure 5, is not threaded and is provided with a shoulder 75 of larger diameter than the remainder of the bolt 76 and of larger diameter than the adjacent smaller diametered portion of the aperture 74. At times when the screw 74 is rotated, the bifurcated lower ends of the detents 66 will be drawn together or permitted to spring apart.

The upper ends of each of the detents 66 are provided with two preferably integral nibs 80. The latter are oppositely disposed and spaced apart with respect to each other, having oppositely disposed parallel surfaces 82 at their lower ends. At their upper ends, the oppositely disposed portions of the nibs 80 are beveled away from each other as indicated at 84.

At times when the detent members 66 are disposed upon the rods 44 and the screws 76 are in proper adjustment, the vertically disposed sides of the detents 66 will be truly parallel and vertical so that the detents may be accurately spaced apart by means of inserting therebetween perfectly machined spacing blocks, not shown, and, by tightening the screws 76, the detents 66 are fixed in permanent spaced relation with respect to each other. A set or plurality of such spacing blocks may be kept adjacent the machine for quickly and accurately spacing the detents 66 apart various distances as is desirable for purposes later described.

A supporting rod 86 is attached respectively to each of a pair of vertical extensions 87, of the brackets 22 at the right-hand side of the machine. The supporting rod 86 is best shown in Figure 9 and is disposed parallel with and above the right-hand one of the tracks 14. A pair of suitable screws 88 are employed at each end of each of the arm-shafts or rods 86 for attaching the latter to the brackets 24. At their upper ends each of the vertical extensions 87 are secured to the corresponding roller supporting brackets 24 by means of suitable bolts 90.

At one end of the supporting rod 86 a bifurcated arm 92 is rigidly secured thereto for rotation with the rod 86. The arm 92 is adapted to extend inwardly from the right-hand side of the rod 86 and the bifurcated inner ends of the arm 92 are apertured for receiving a pin 94, to which a shaft 96 is pivotally secured. The shaft 96 is provided with a ball 98 secured thereto, in spaced relation with respect to the pin 94.

The ball 98 is adapted to be received in a socket 100 in an "L-shaped" socket bracket 102. The socket bracket 102 is provided with a horizontal portion rigidly secured in any suitable manner to one of the right-hand end portions 22 of the track-supporting bracket 20. The L-shaped socket bracket 102 has a vertically disposed portion extending downwardly from and secured to the horizontal portion and securely attached thereto.

The lower end of said vertically disposed bracket portion is bifurcated for providing a slot, the upper end of which is shown at dotted lines in Figure 8 at 104. The slot 104 extends from the bottom of the vertically disposed socket bracket portion upward through and past the well 100.

The purpose of the slot 104 is to receive the inward end of the shaft 96 and to permit the inward end of the shaft 96 to swing in a vertical plane at times when the ball 98, which is concentric with the shaft 96, is disposed in the well 100 on the outer or right-hand side of the vertically disposed portion of the socket bracket portion 102.

A coiled compression spring 106 is disposed on the shaft 96 between the ball 98 and a collar 108 having a set screw 109. The collar 108 is so positioned on the shaft 96 with respect to the ball 98 that when the arm 92 and the pin 94 are in an up position or in a down position with respect to a direct line between the well 100 and the bolts 90, the spring 106 will tend to hold the arm 92 in such a position.

A dog including a locking dog arm 110 is provided, adapted to swing in a vertical plane for cooperation with the detent 66 and the latter is rigidly secured about the rod 86 at its inner end by means of a set-screw or bolt 112 as best shown in Figure 9.

At the outer end of the locking dog arm 110, the locking dog is provided with a tab 114 which is secured to the under side thereof by means of a suitable screw 116. The tab 114 is provided with a lower end of rectangular shape in horizontal cross-section, the width of said lower end corresponding to the spacing of the vertically disposed parallel walls 82 of the nib 80. The tab 114 tapers outwardly at its upper end corresponding to the inclined upper oppositely disposed walls 84 of the nibs 80. At its outer end the locking dog arm 110 extends beyond the tab 114 sufficiently for providing a handle so that the operator may swing the tab 114 into and out of engagement with the detent 66 against the action of the spring 106.

Figure 2:
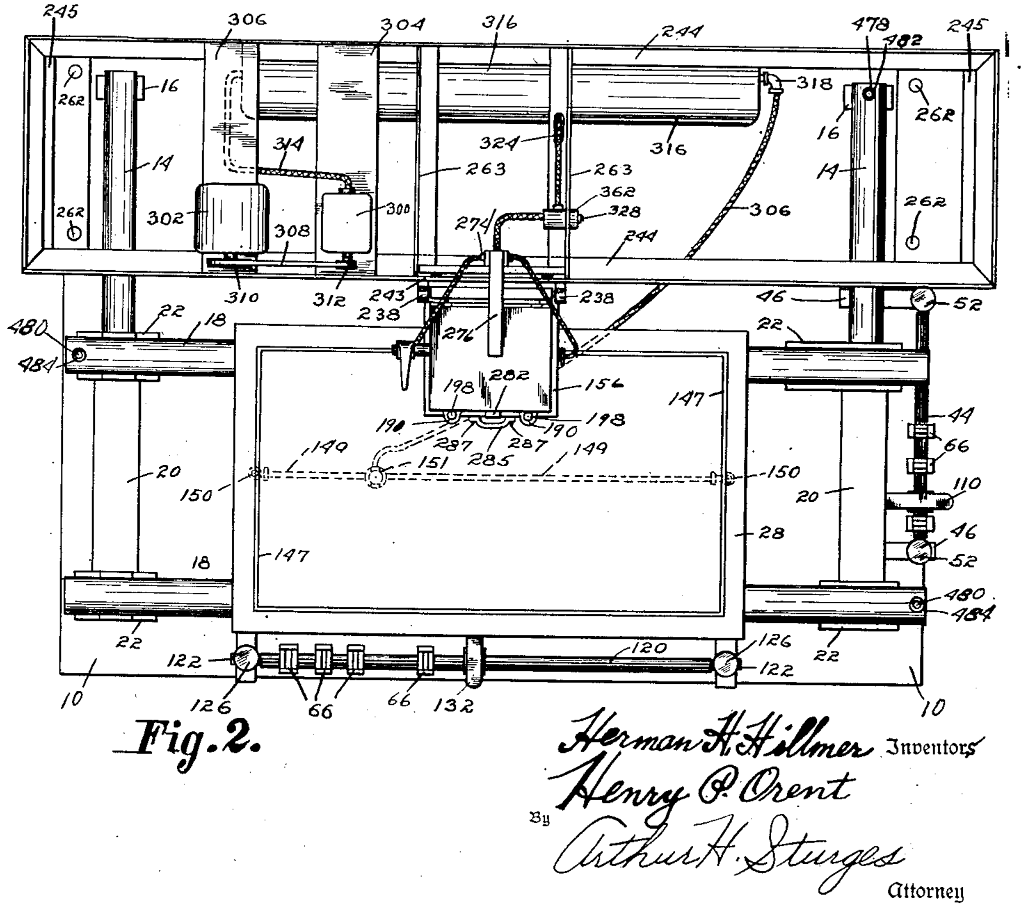
Figure 2 is a top plan view thereof.

As best shown in Figures 1 and 2, a second detent supporting rod 120 is disposed in parallelism with and spaced outwardly from the outer upper track 13. The rod 120 is similar in all respects to the detent supporting rod 44 and is provided with flattened ends 122 similar to the flattened ends 58 of the rod 44. The rods 44 and 120 are both non-round and are provided with longitudinal ridges similar to the ridge 64. The rod 120 is mounted upon a pair of suitable brackets 124, and held in position thereon by means of suitable set-screws 126 which are identical in all respects with the set-screws 50. The brackets 124 are, in turn, secured to the bottom of the forward upper track 18 by means of suitable bolts 127. Mounted in spaced relation upon the rod 120 are a plurality or row of detents 130 having tightening bolts 131, and the latter are similar in all respects to the detents 66 and are disposed at a right angle thereto.

The rods 44 and 120 are both provided with at least an elongated center portion thereof of a uniform cross-section for receiving detents slideably thereon.

A second locking dog including a second locking dog arm 132 is provided having a tab 134 for engaging the detents 130 and the arm 132 is similar in all respects to the arm 110. At its rearward end the arm 132 is rigidly secured to a suitable arm shaft 134 and the latter is rotatably mounted in suitable brackets 136 to the under side of the holder 28.

Also secured to the shaft 134 is a bifurcated arm 138 which is pivotally secured at its rearward end to a rod 140, having a coiled spring disposed thereabout, and a ball 142 rigidly secured thereto, the latter being adapted to be engaged in a suitable well, in a well supporting bracket 146.

The rod 140, ball 146 and adjunct parts are similar in all respects to the ball 98 and rod 96 and associated parts. The purpose of the arm 138 and spring 142 is to maintain the locking dog arm 132 in an engagement with the detents 130 as later described.

The lower holder 28 is of rectangular shape in plan, as shown in Figure 2. The upper surface of the holder 28 is provided with a channel 147 of rectangular shape in plan and of triangular shape in cross-section. The channel 147 follows the perimeter of the holder 28 and is inwardly spaced therefrom.

Figure 7:
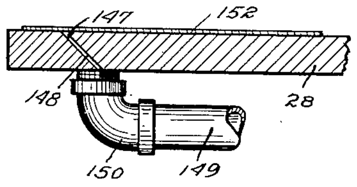
Figure 7 depicts a fragmentary portion of a vacuum connection for a photographic positive holder employed, the said connection being employed for causing photographic material to adhere to a flat surface.

As best shown in Figure 7, two or more parts 148 are provided extending through the holder 28, the lower ends of the part 148 being in communication with hoses 149 through suitable couplings 150. The parts 148 are preferably disposed at opposite sides of the channel 147. The hoses 149 are each attached to a valve 151 which is in turn in communication with a vacuum tank as later described.

The purpose of the vacuum channel 147 is to secure a piece of image-receiving printing material 152, usually positive, to the flat upper surface of the lower holder 28 by opening the valve 151 and permitting a vacuum to be drawn on the plate 152 through the channel 147.

Figures 10, 11, 12, 13:
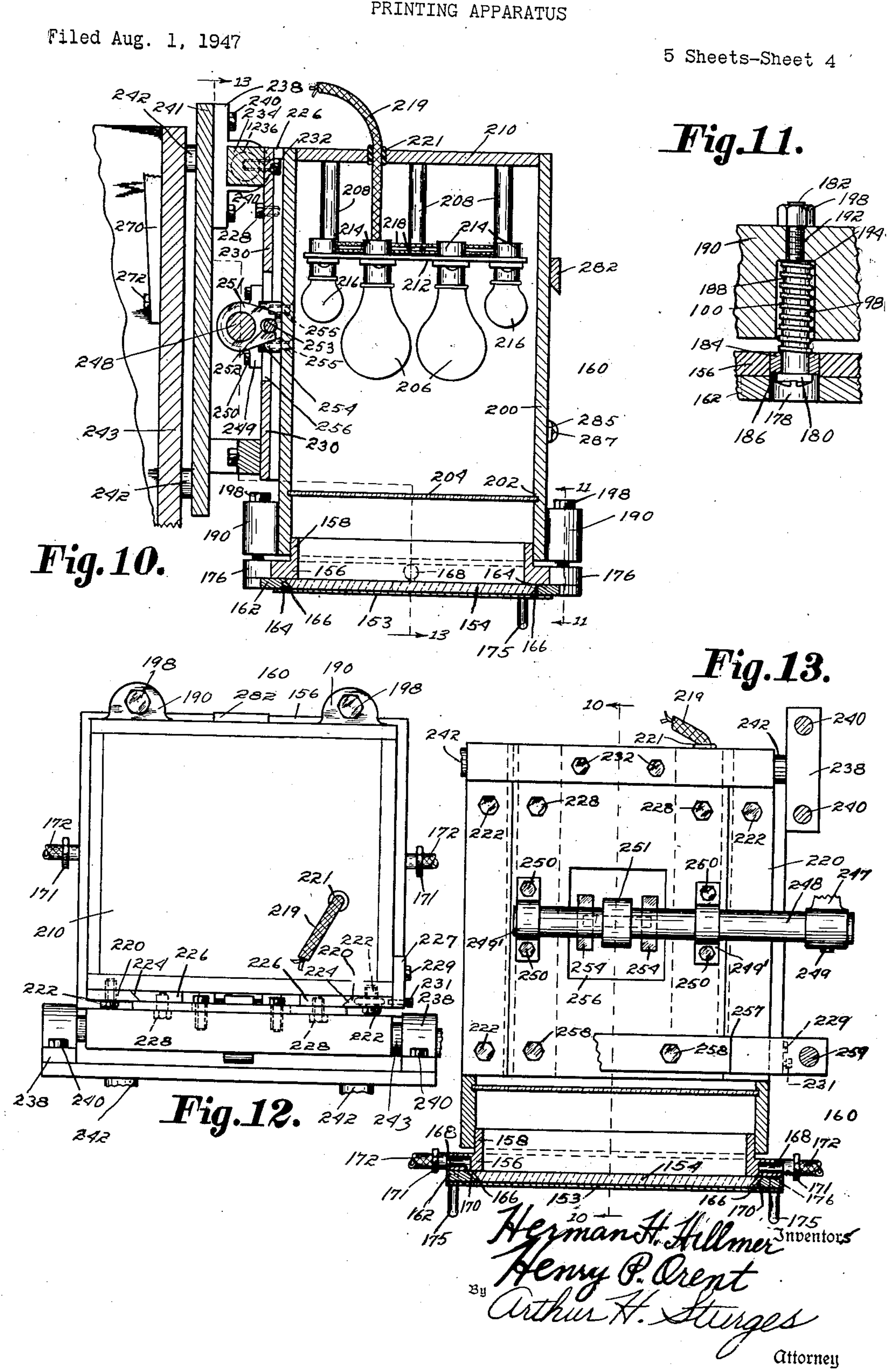
Figure 10 is a view-in-section of a lamp-housing employed together with adjunct parts of the latter and portions of the frame being broken away; the view being taken along the line 10—10 of Figure 13.
Figure 11 is a view-in-section taken along the line 11—11 of Figure 10 of one of four compensating devices employed for causing a photographic negative secured to the lamp-housing, to become truly positioned and in light excluded contact with a film plate employed.
Figure 12 is a top plan view of the lamp-housing shown in Figure 10, together with adjunct parts thereof.
Figure 13 is a view-in-section of the lamp-housing and attached adjunct parts as seen along line 13—13 of Figure 10.

Above the lower platform or holder 28 an upper holder having a flat under surface 154 is provided, as best shown in Figure 10. The upper holder is for the purpose of receiving a sheet of image-bearing printing material 153, disposed against the flat translucent underside 154 thereof, the material 153 usually being a negative film.

The underside 154 of the upper holder is composed preferably of a piece of translucent material such as plastic or glass normally disposed in a horizontal position, in parallelism with the upper surface of the platform or holder 28. The plastic or glass piece is provided with outwardly and upwardly beveled edges. The piece of glass 154 is disposed beneath and against the underside of a preferably rectangular annular glass holder 156, and the latter is provided with a vertically extending rectangular flange 158 of lesser size in outer dimension than the inner walls of a later described rectangular normally vertically disposed lamp-box generally indicated at 160, so that the flange 158 is slideably disposed within the lower end of the latter, forming a bottom to the box 160, together with the glass plate 154.

The plate 154 is held in place against the flat lower side of the holder 156 by means of a rim 162, of rectangular shape in plan, which is flat on its upper and lower sides and inwardly pointed on its inner edge 164. The inclined upper surface of the pointed edge 164 is complemental to the beveled outer edge of the glass plate 154 and is adapted to bear upwardly against the latter to hold the plate against the holder 156, since the rim 162 is attached by any suitable means to the horizontally disposed main body portion of the holder 156.

The lower surface of the pointed edge 164 is inclined away from the beveled edge of the glass plate 154 for forming a channel or passageway 166, of triangular shape in cross-section and of rectangular shape in plan. As best shown in Figure 13, the holder 156 is provided with two openings 168 extending inwardly from the opposite sides thereof.

The openings 168 are in communication with the channel or passageway 166 through suitable ports 170. Attached by means of suitable couplings 171 to the outer end of the openings 168 are two vacuum hoses 172. The purpose of the vacuum hoses 172 is to place the notched passageway 166 in communication with a later described vacuum pump for drawing a vacuum on the passageway 166 to cause the negative film 153 to adhere to the glass plate 154 during operation.

As best shown in Figure 13, a pair of round spaced apart pins 175 are removably received in two circular recesses 176, which latter extend inwardly of the bottom of the glass plate 154. The recesses 176 are disposed on the forward side of the rim 162, as shown in Figures 10 and 13, so that at times when the box 160 is tilted upwardly into a horizontal position as later described, the pins 175 will be positioned on the upper side of the rim 162 and protrude forwardly therefrom, for facilitating the positioning of a photographic negative on the glass plate 154.

The holder 156 is provided with four outstanding ears 176 extending outwardly in a horizontal direction adjacent each corner thereof, as shown in Figure 10. The ears 176 are provided with suitable apertures 178, vertically disposed therethrough, for receiving the heads 180 of four bolts 182. The apertures 180 are of a larger diameter at their lower ends than at their upper ends and a collar 184 is provided at the upper end of each of the apertures 178, for restricting the latter and for forming a suitable shoulder 186 for preventing the passage therethrough of the heads 180 of the bolts 182.

The main shanks of the bolts 182 extend vertically through suitable vertically disposed openings 188, in each of four lugs 190. The latter are rigidly secured to each of the corners of the rectangular box 160 in such positions that the openings 188 are in vertical alignment with the openings 178. The bolts 182 each extend upwardly through the openings 188 and into a restricted upper portion 192 of the latter, the restricted portions 192 being for the purpose of providing suitable shoulders 194 for bearing against the adjacent shoulders of the bolts 182, the said shoulders being formed between the main body portion of the bolts 182 and an upper, threaded, bolt portion of lesser diameter.

The threaded portions of the bolts 182 extend upwardly through each of the lugs 190 and are provided with nuts 198 for the purpose of drawing the shoulders of each of the bolts 182 against the shoulders 194 of the lugs 190 so that the bolts 182 are maintained in rigid normally vertical positions.

The purpose of the bolts 182 is to secure the holder 156 to the box 160 and a coiled compression spring 100 is provided on each of the bolts 182 for bearing against the shoulder 194 and the collars 184 to urge the holder 156 downwardly from the box 160 during operation. This is to cause the negative printing film 153 to be in tight engagement with a positive photographic plate, which is placed during operation upon the top of the lower holder 28, despite variances in thicknesses of the positive and negative plates and despite possible mechanical defects.

The inner side of the side walls 200 of the box 160 are provided with a suitable notch 202 of generally rectangular shape in cross-section as well as in plan view. The notch 202 is for receiving and supporting a piece of frosted glass 204. Any other material may be used in place of frosted glass as long as it fulfills the purpose of diffusing light, from later described bulbs 206, evenly over the glass plate 154.

A source of light is provided including one or more light bulbs 206, suspended by means of suitable standards 208 from the top 210 of the box 160. At their lower ends the standards 208 are fixed to a supporting platform 212. The latter is in turn provided with a plurality of suitable sockets 214 extending downwardly therefrom and supported thereby. Bulbs of various sizes may be placed within the sockets 214, as is illustrated in Figure 10 by the comparatively smaller size of other bulbs 216. The satisfactory use of light bulbs of various sizes is made possible through the light diffusing properties of the frosted glass plate 204.

Each of the sockets 214 is placed in communication by means of suitable wires 218 and 219 with a suitable source of electrical energy, not shown. The main current supplying wires 219 extend upwardly from the wires 218 and through a suitable insulator 221 on the top 210 of the box 160.

On its rearward side, the box 160 is provided with two normally vertically disposed guides 220. The latter are positioned at each side of the rearward wall of the box 160 and are secured thereto by means of suitable bolts 222. The oppositely disposed edges of the guides 220 are normally vertical and are beveled towards each other at their outer or rearward ends for complemental engagement with the beveled edges 224 of a pair of vertically disposed guide-tracks 226. The latter are, in turn, secured by means of suitable bolts to a vertically disposed plate 230.

As best shown in Figuure 13, a bar 227 is attached by bolts 229 to one side of the box 160 adjacent to and overlapping the outer side of the rearward wall thereof. The bar 229 is for threadedly receiving set screws 231 which are in positions for bearing against one of the guides 220 to force the same into closer engagement with the adjacent guide-tracks 226.

At its upper end the plate 230 is secured by means of suitable bolts 232 to a horizontally disposed bar 234 which is rounded at its outer ends for pivotal receipt in suitable apertures 236 in a pair of pillow blocks 238. Thus the lamp box 160 and upper holder are permitted to swing or pivot through a vertical plane transverse to the parallel horizontal planes defined by the upper side of the platform 28 and the lower side 154 of the upper holder during use.

Figure 4:
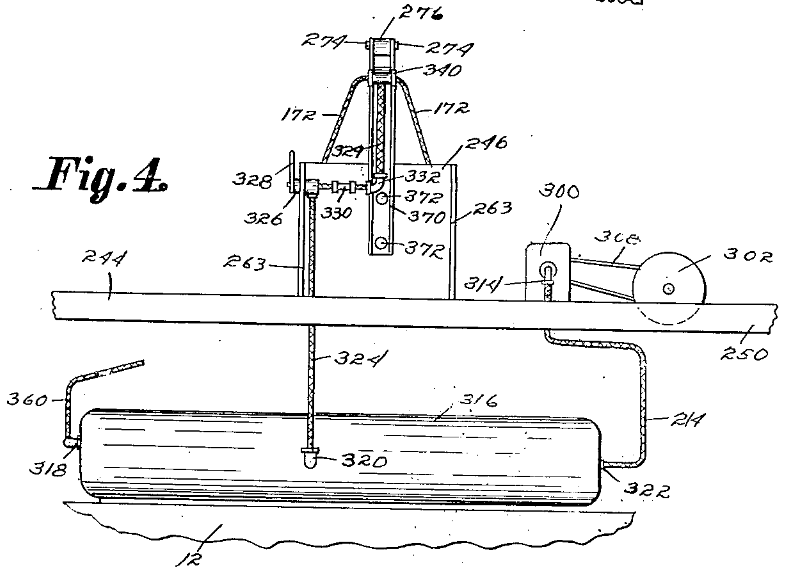
Figure 4 is a view of a broken away portion of the back of the machine and showing a vacuum tank.

The pillow blocks 238 are in turn secured by means of suitable bolts 240 to a vertically disposed face-plate 241. The face-plate 241 is attached by means of four horizontally disposed spaced apart pegs 242 to a vertically disposed face-plate 243. The face-plate 243 extends sideways of the machine a distance to slightly greater than the transverse width of the lamp box 160. At its under side, the face-plate 243 is welded or otherwise suitably secured to a rectangular supporting frame 244, as best shown in Figures 2 and 4, and at its sides the face-plate.

The supporting frame 244 is preferably formed of angle iron and is of elongated rectangular shape in top-plan view. The frame 244 is provided with two transverse angle irons 245 extending from the front to the back at each end thereof. The latter are in turn supported upon four spaced apart suitable posts 246 which extend vertically downwardly from the angle irons 245.

In order to move the lamp-housing a vertical direction and without swinging it and for purposes later described a lever 247 is preferably employed. The lever 247 is swingable in a vertical plane and the lower end thereof is rigidly attached to a shaft 248 by means of a collar 249 having a set-screw extending therethrough.

As best shown in Figure 13, the shaft 248 extends through two spaced apart pillow blocks 249'. The latter are attached by means of bolts 250 or of other suitable keepers to the rear closed wall of the lamp-housing 160 as best shown in Figure 13. A cam or collar 251, as best shown in Figure 10, is rigidly attached to the shaft 248 between the pillow blocks 249. The member 251 is provided with a kerf 252 for receiving therein an elongated horizontal lug 253, or the like, the latter being spaced from and attached to the rear wall of the lamp-housing 160, by means of two spaced apart blocks 254, carrying the ends of the lug 253. Machine screws 255 secure the blocks 254 to the rear wall of the lamp-housing 160.

An aperture 256 is provided through the vertically disposed plate 230 and between the blocks 250 to receive the cam 251 for permitting the lever 247 to move the lamp-housing with respect to the member 230.

A bumper, best shown in Figures 10 and 11, is provided for properly spacing the plate 230 from the face-plate 241 so as to maintain the glass 154 horizontal during operation. The bumper may be in any desired shape fulfilling the purpose and is shown as a horizontal bar 257 secured to the rearward side of the plate 230 by means of bolts 258. The ends of the bar 257 shown, are of greater width than the remainder and are adapted to rest against the plate 241 when the lamp-box 160 is vertically disposed.

Two bolts 259, one of which is shown in cross-section in Figure 13, are provided, one in each end of the bar 257. The bolts 259 are for threaded engagement with the walls of apertures, not shown, in the face-plate 241, so that the bolts 259 will rigidly and releasably secure the lamp-box 160 to the face-plate 241. Other releasable clamping or locking means may obviously be used in place of the bolts 259.

The posts 246 are mounted at their lower ends on other suitable horizontally disposed angle irons 260 and the horizontal sides of the latter are secured by means of suitable bolts 262, to the upper side of the platform 10.

As best shown in Figure 4, the plate 243 extends sideways of the machine and is braced by two vertically disposed brace plates 263 attached at right angles to each side of the plate 246. A standard 270 is attached to the rearward side of the plate 246 by means of suitable bolts 272. The standard 270 is vertically disposed and is pivotally connected at its upper end by means of a pin 274 with a latch arm 276, which is provided with a horizontal opening therethrough at its rearward end for receiving the bolt 274 and with a protruding catch portion 280 at its forward end, as shown in Figure 3, for engaging a suitable hook 282, which latter is secured to the forward side of the lamp-box 160.

Figure 3:
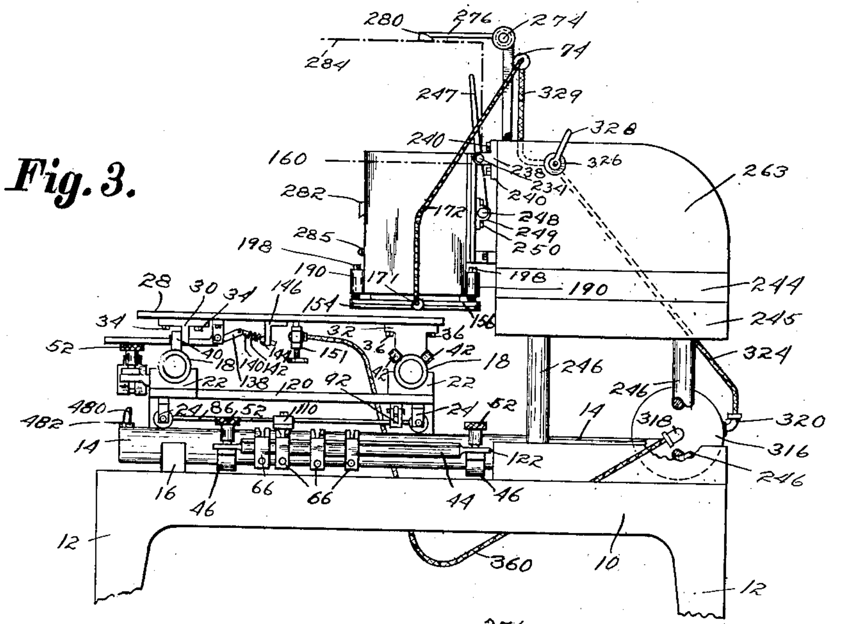
Figure 3 is an end view of the new device, same being the right-hand end with respect to Figure 1.

The hook 282 is of rectangular shape in side elevation, as best shown in Figure 1, and is provided with a forwardly and downwardly inclined lower side for engaging cooperatively with that side of the end portion 280, which is disposed toward the pivot pin 274, the said side being inclined downwardly and toward the pin 274, at times when the arm 276 is in a horizontal position as shown in Figure 3.

The purpose of the latch arm 276 is for maintaining the lamp-housing or box 160 in a horizontal position as shown in dotted lines at 284 in Figure 3 for rendering the under surface of the housing 160 accessible to the operator as later described by swinging the housing 160 in the pillow blocks 238 by means of a handle 283 which is secured to the forward wall of the lamp box 160 by bolts 287.

The rectangular frame 244 serves the further purpose of supporting a pump 300 and a motor 302, which latter are mounted on two spaced apart transverse supports 304 and 306 respectively, the latter being suitably secured to the frame 244. The motor 302 is disposed in spaced apart parallelism with the pump 300 and is drivably connected therewith by means of a suitable belt 308 and pulleys 310 and 312.

The outlet side of the pump 300 is in communication with a hose 314 and the latter interconnects the pump 300 to one end of a vacuum tank 316. The latter is mounted on the platform 10 at the rearward end thereof and is provided with two inlet ports 318 and 320 spaced from the outlet ports 322 to which the hose 314 is coupled.

The inlet port 320, which is adjacent the center of the tank 316, is in communication with a suitable hose 324 and the latter extends upwardly toward a valve 326, the latter being provided with a suitable operating handle 328. The valve 326 is for the purpose of opening and closing the line between the hose 324 and a vertically extending hose 329. The latter is secured at one end to the valve 326 by suitable couplings 330 and 332 at the outer end to a T-coupling 340.

The T-coupling 340 is attached to two oppositely extending vacuum hoses 172, which are in communication with the vacuum channel 166 as previously described.

The end coupling 318 is attached by means of the hose 360 to the hand-valve 151 for controlling the vacuum in the lower vacuum channel 147.

Figure 14:
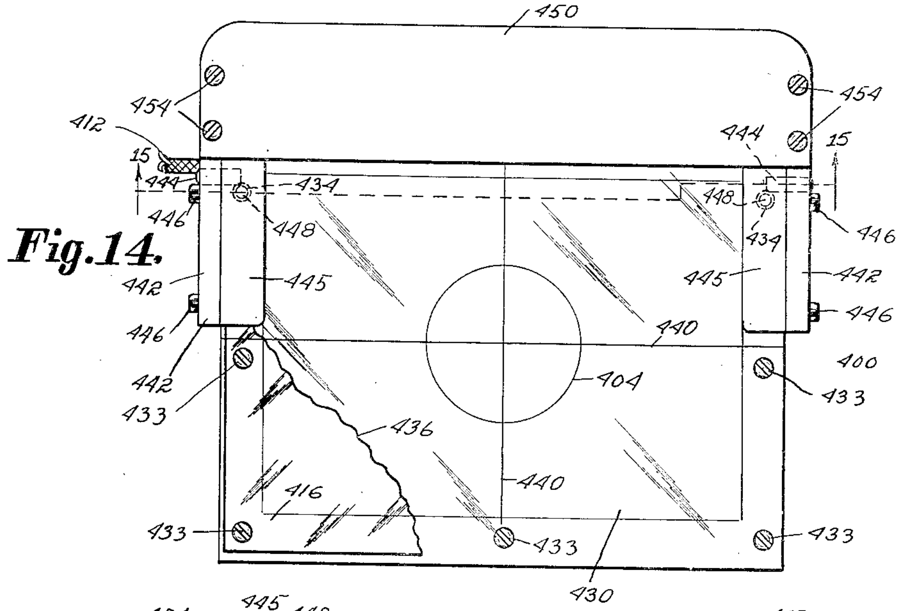
Figure 14 is a top plan view of a film punching device employed.
Figure 15:
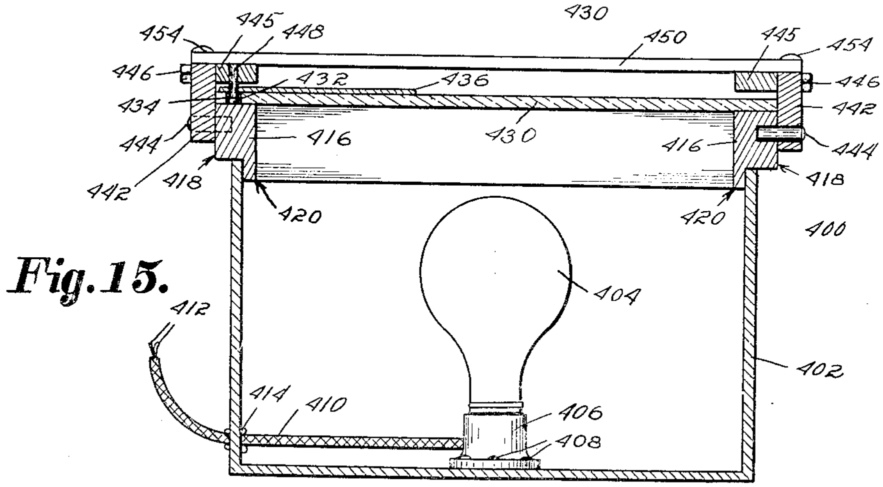
Figure 15 is a view-in-section taken along the line 15—15 of Figure 14.
Figure 16:
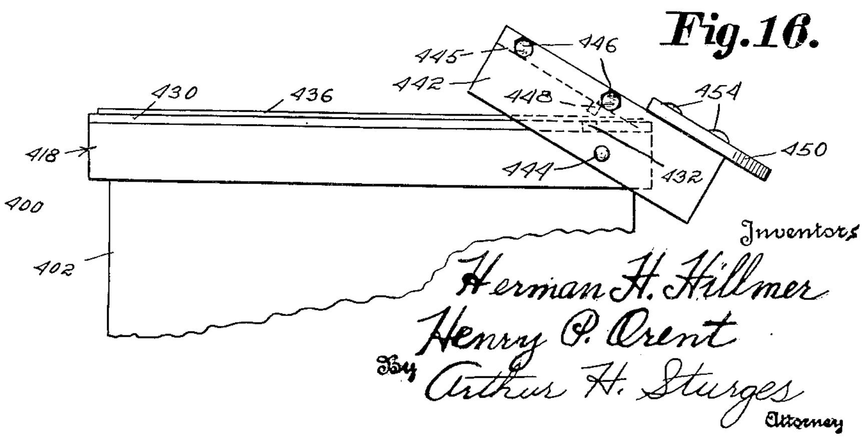
Figure 16 is a fragmental side view of the punch of Figure 14.

The invention further includes a punching device generally indicated at 400, best shown in Figures 14 to 16. The latter is mounted upon a box 402, inside of which a source of light, preferably a bulb 404, is mounted in a socket 406. The latter is in turn secured to the bottom of the box 400 by screws 408.

An electrical cord 410 extends from the socket 406 through an aperture in a side of the box, the terminals 412 of the cord 410 are in communication with a suitable source of electrical energy, not shown. An annular insulator 414 is provided between the cord 410 and the walls of the cord aperture.

At the top of the box 402, a rectangular rim 416 is provided, the latter having a main body portion 418 of larger perimeter than the sides of the box 402 for resting on the top of the latter, and also having a downwardly protruding rectangular flange portion 420 of slightly lesser perimeter than the sides of the box 402 for reception therein.

A horizontal plate 430 of translucent material, preferably plastic or glass, is disposed upon the top of the rim 416, the plate 430 having the same outer dimensions as the rim 416.

Two round apertures 432 are provided in the plate 430 for the purpose of receiving later described punches. The sidewalls of each of the apertures 432 are preferably lined with a suitable metallic lining 434 for providing an upper cutting surface for cooperation with said punches.

The purpose of the plate 430 is to support a piece of film or other photographic material 436, usually a negative, during punching thereof. The plate 430 is provided with indicia therein or thereon for cooperation with other marks or indicia on the material 436 to facilitate the alignment of the image on the latter with respect to the apertures 432 for accurate punching of holes. Such indicia are preferably in the form of cross hairs 440 disposed at a right angle to each other and in parallelism with the respective sides of the rim 416.

Other indicia such as two or more dots, for registry with corresponding dots on the negative, could be used in place of the cross hairs 440.

The plate 430 is secured to the rim 416 by screws 433 extending through apertures in the former, the screws being threadedly received in the rim 416.

A common punch and mallet may be used to punch holes in the negative 436. A permanently attached punching mechanism is preferred, however. The latter includes two bars 442 pivotally attached at their centers to opposite sides of the rim 416 by means of pins 444.

A pair of horizontally disposed punch-holding flanges 445 are attached, one each, to the bars 442 by means of bolts 446. The undersides of the flanges 445 are flat and are provided with punches 448 secured therein at a right angle to the flat underside of the flanges 445. The punches 448 are of proper size and in proper position for reception in the apertures 432.

A handle 450 in the form of a flat plate extends between and is attached to the rearward ends of the bars 452 by means of screws 454.

In operation, a sheet of negative photographic material 436 having an image thereon, is placed upon the plastic plate 430 of the punch box 400. The negative 436 is then centered so that marks thereon, which have been previously accurately placed with respect to the image, are caused to register with the cross-hairs 440, and at a time when the bars 442 and the punches 448 are in an upwardly tilted position as illustrated in Figure 16.

The operator will then grip the handle 450 and tilt the same forward causing the punches 448 to punch holes in the negative 436 in cooperation with the metal lining 434 of the apertures 432. The punches 448 are then returned to the position shown in Figure 16 and the negative 436 is removed.

The latter is then placed against the glass plate 154 of the upper holder of the lamp-box 160 at a time when the latter is held in a horizontal position by the latch arm 276 as illustrated in broken lines at 284 in Figure 3. The pins or pegs 175 are then inserted through the apertures thus formed in the negative and into apertures in the rim 162, and at a time when the valve 326 is closed.

The valve 326 is then opened for permitting the vacuum tank 316 to draw a vacuum upon the negative plate 153 through the channels 166. The pins 175 may then be removed from the supporting rim 162 and as long as the valve 326 remains open, the vacuum will cause the negative 153 to adhere to the glass 154.

A piece of positive photographic material, not shown, may then be placed upon the lower holder or platform 28. Such positive material will be of a larger size than the negative 153 and of a size corresponding substantially to the outer dimensions of the platform 28. The valve 151 may then be opened for causing the vacuum tank 316 to draw a vacuum upon the positive plate through the channel 147 for holding the positive plate securely in place upon the platform 28. The lamp-box 160 is then released from the latch arm 276 and permitted to pivot into a vertical position.

The detents 66 and 130 are then caused to be properly spaced apart upon their respective guide rods 44 and 120. This is accomplished by selecting suitable accurately dimensioned spacing blocks, not shown, from a rack near the machine, placing desired ones of the blocks between successive detents 66 and 130 to measure the spacing of the latter, and by tightening the screws 76 for rigidly securing the detents 66 and 130 in desired positions with respect to each other.

The platform or lower holder 28 is then placed in a desired position with respect to the upper holder 156 by sliding the latter longitudinally and transversely upon the respective tracks or rails 14 and 18 until the locking dog arms 110 and 132 are positioned so that their tabs will be in registry with the opposing walls 82 and 84 of the nibs 80 of the detents 66 and 130.

Excessive travel of the wheels 26, 40 and 42 along their respective rails 14 and 18 is prevented by stop-pins 448 and 450, having shoulders 452 and 454 which latter are secured in suitable apertures in the ends of at least one rail of each of the pairs of rails 14 and 18.

The locking dog arms 110 and 132 are then urged downwardly against selected ones of the detents 66 and 130. In such position, the springs 106 will cause the locking dog arms to remain in tight engagement with the detents, as previously described. At such times the locking dog arms and detents and associated parts are in the position illustrated in Figure 8.

The operator will then lower the upper holder 156 by pulling forwardly on the lever 247, rotating the cam 251 in a clock-wise direction as shown in Figure 10 for pushing downwardly upon the lug 253. This, in turn, will cause the lamp box 160 to travel downwardly, the guides 220 thereof sliding vertically with respect to the guide-tracks 226.

As the negative printing film 153 comes into engagement with the positive printing material, the coiled springs 100, best shown in Figure 11 tend to be contracted for urging the positive and negative plates into tight engagement so that light cannot enter between the marginal edges thereof, despite the variances in the thicknesses of the positive and negative plates and other possible machinery defects.

The light bulbs 206 and 216 are then caused to be lit for a desired period of time, usually through the use of a timing switch, not shown. Light from the various bulbs 206 and 216 is caused to be relatively evenly dispersed across the negative film 153 through the action of the frosted glass plate 204.

When the positive plate has been exposed a proper length of time the operator will then swing the lever 247 upwardly and rearwardly for causing the lamp box 160 to be vertically disposed away from the lower holder 28. At this time, the operator will again shift the lower holder 28 transversely or longitudinally as is desired for placing the locking dog arms 110 and 132 in engagement with other desired detents 66 or 130. During these motions, the locking dog arms 110 and 132 will be maintained in an upward position, out of engagement with the detent 130 and detents 66 through the action of the springs 106 and the lower holder 28 will move in a parallel plane with respect to the underside 154 of the upper holder. The locking dog arms 110 and 132 may then again be lowered into engagement with other selected detents in their respective rows.

The lever 247 may then be pulled forwardly and downwardly for bringing the negative film 153 into engagement with a different portion of the positive material on the lower holder 28 and the exposure step may be repeated. Successive shiftings of the lower holder with respect to the upper holder 156 and successive exposure steps as described, will cause the positive image receiving material to become exposed with the image represented on the negative film in a plurality of accurately spaced positions, so that waste will be avoided and operating time will be saved. The positive and negative plates may then be released from their respective holders by closing the vacuum valves 151 and 326 respectively.

This invention provides a contact printing machine for accurately reproducing a single image or group of images from image-bearing printing material into a plurality of accurately spaced positions on image-receiving printing material, in a manner whereby waste is eliminated and operating time conserved and by means of which photographic plates may be attached thereto in a more facile manner than heretofore; and this invention further provides a negative plate punching device for accurately punching alignment holes.

It will be seen that in lieu of the film 153, any image-bearing printing material can be used, for example, a metallic printing plate. In the use of the latter, of course, the lights 206 and 216 will have no effect. Also, any cooperative image receiving material can be placed opposite the image-bearing material 153. The terms positive and negative used throughout are relative and either may be referred to as the positive or the negative material, the lights and shades in each being reversed with respect to the lights and shades of the other.

We claim:

1. A contact printing machine comprising a horizontally disposed bed on a mounting frame, spaced transversely disposed parallel rails mounted in the frame, supporting brackets mounted to travel on the said transverse rails, spaced longitudinally disposed parallel tracks carried by said supporting brackets, a film holder platform mounted to travel on the said longitudinal tracks, a rectangular shape lamp housing positioned above the said platform, means mounting the lamp housing for vertical travel on the frame and also for vertical travel in relation to the said platform, a shaft having a cam and also a hand lever thereon journaled on the frame, a lug carried by the lamp housing and positioned to coact with the cam for elevating the said lamp housing, a translucent plate mounted in the lower end of the said lamp housing, means retaining a film against the said translucent plate on the lower end of the lamp housing, means pivotally mounting the lamp housing through the upper end thereof on the said frame, whereby the lamp housing is operative from a vertical to a horizontal position, and means for actuating the said lamp housing from the vertical to a horizontal position.

2. A contact printing machine comprising a horizontally disposed bed on a mounting frame, spaced transversely disposed parallel rails mounted in the frame, supporting brackets mounted to travel on the said transverse rails, spaced longitudinally disposed parallel tracks carried by said supporting brackets, a film holder platform mounted to travel on the said longitudinal tracks, a rectangular shape lamp housing positioned above the said platform, means mounting the lamp housing for vertical travel on the frame and also for vertical travel in relation to the said platform, a shaft having a cam and also a hand lever thereon journaled on the frame, a lug carried by the lamp housing and positioned to coact with the cam for elevating the said lamp housing, a translucent plate mounted in the lower end of the said lamp housing, means retaining a film against the said translucent plate on the lower end of the lamp housing, means pivotally mounting the lamp housing through the upper end thereof on the said frame, whereby the lamp housing is operative from a vertical to a horizontal position, means for actuating the said lamp housing from the vertical to a horizontal position, and positioning means for locating the platform in printing positions transversely and also longitudinally of the mounting frame.

3. A contact printing machine comprising a horizontally disposed bed on a mounting frame, spaced transversely disposed parallel rails mounted in the frame, supporting brackets mounted to travel on the said transverse rails, spaced longitudinally disposed parallel tracks carried by said supporting brackets, a film holder platform mounted to travel on the said longitudinal tracks, a rectangular shape lamp housing positioned above the said platform, means mounting the lamp housing for vertical travel on the frame and also for vertical travel in relation to the said platform, a shaft having a cam and also a hand lever thereon journaled on the frame, a lug carried by the lamp housing and positioned to coact with the cam for elevating the said lamp housing, a translucent plate mounted in the lower end of the said lamp housing, means retaining a film against the said translucent plate on the lower end of the lamp housing, means positioning films and the like on the light housing and platform, means pivotally mounting the lamp housing through the upper end thereof on the said frame, whereby the lamp housing is operative from a vertical to a horizontal position, and means for actuating the said lamp housing from the vertical to a horizontal position.

HERMAN H. HILLMER.
HENRY P. ORENT.

REFERENCES CITED

The following references are of record in the file of this patent:

UNITED STATES PATENTS

| Number | Name | Date |
|---|---|---|
| 954,290 | Huebner | Apr. 5, 1910 |
| 1,137,454 | Bowser | Apr. 27, 1915 |
| 1,471,672 | Wehrli | Oct. 23, 1923 |
| 1,750,294 | Bassist | Mar. 11, 1930 |
| 1,784,206 | Snyder | Dec. 9, 1930 |
| 1,787,662 | Boedicker | Jan. 6, 1931 |
| 1,813,689 | Weisker | July 7, 1931 |
| 2,049,557 | Cooper et al. | Aug. 4, 1936 |
| 2,169,891 | Beal et al. | Aug. 15, 1939 |
| 2,200,365 | Nickelsberg | May 14, 1940 |
| 2,210,726 | Mazzocco | Aug. 6, 1940 |
| 2,237,704 | Huebner | Apr. 8, 1941 |
| 2,418,226 | Haff | Apr. 1, 1947 |
| 2,421,500 | Haff | June 3, 1947 |
| 2,451,730 | Greenlee | Oct. 19, 1948 |

FOREIGN PATENTS

| Number | Country | Date |
|---|---|---|
| 173,116 | Great Britain | Dec. 29, 1921 |
| 528,088 | Germany | June 25, 1931 |
| 596,361 | Germany | May 3, 1934 |
| 695,799 | Germany | Sept. 3, 1940 |